United States Patent
Deane et al.

(10) Patent No.: US 11,630,896 B1
(45) Date of Patent: Apr. 18, 2023

(54) BEHAVIOR-BASED ELECTRONIC ESSAY ASSESSMENT FRAUD DETECTION

(71) Applicant: Educational Testing Service, Princeton, NJ (US)

(72) Inventors: Paul Douglas Deane, Lawrence Township, NJ (US); Ick Kyu Choi, Wayne, PA (US); Jiangang Hao, Princeton, NJ (US); Mo Zhang, Princeton, NJ (US)

(73) Assignee: Educational Testing Service, Princeton, NJ (US)

( * ) Notice: Subject to any disclaimer, the term of this patent is extended or adjusted under 35 U.S.C. 154(b) by 448 days.

(21) Appl. No.: 16/811,281

(22) Filed: Mar. 6, 2020

Related U.S. Application Data (60) Provisional application No. 62/814,955, filed on Mar. 7, 2019.

(51) Int. Cl.
   *G06F 21/00* (2013.01)
   *G06F 21/51* (2013.01)
   (Continued)

(52) U.S. Cl.
   CPC .......... *G06F 21/51* (2013.01); *G06F 11/3013* (2013.01); *G06F 11/3438* (2013.01);
   (Continued)

(58) Field of Classification Search
   CPC .. G06F 21/51; G06F 11/3013; G06F 11/3438; G06F 2221/033; G06N 5/04; G06N 20/20
   See application file for complete search history.

(56) References Cited

U.S. PATENT DOCUMENTS 9,436,808 B2 * 9/2016 Sheppard ................ H04L 67/10
10,109,215 B2 * 10/2018 Frempong ................ G09B 7/02
(Continued)

FOREIGN PATENT DOCUMENTS

| CN | 104809377 A | * | 7/2015 | |
| CN | 111241883 A | * | 6/2020 | |
| WO | WO-2011115644 A1 | * | 9/2011 | ............... G09B 7/00 |

OTHER PUBLICATIONS

Almond, Russell, Deane, Paul, Quinlan, Thomas, Wagner, Michael, Sydorenko, Tetyana; A Preliminary Analysis of Keystroke Log Data From a Timed Writing Task; Educational Testing Service, Research Report RR-12-23; Nov. 2012.

(Continued)

*Primary Examiner* — Don G Zhao
(74) *Attorney, Agent, or Firm* — Jones Day (57) ABSTRACT

Biometric keystroke measure data derived from a computer-implemented long form examination taken by an examinee is received. Features are the extracted from the biometric keystroke measure data for the examinee. A similarity value is then determined, using one or more of a direct distance approach or a machine learning approach, for the extracted features relative to features extracted from biometric keystroke measure data derived from each of a plurality of other examinees while taking the long form examination. At least one of the determined similarity values is then identified having a value above a pre-defined threshold. The pre-defined threshold indicates a likelihood of the examinee being the same as one of the other examinees. Data can then be provided that characterizes the identification. Related apparatus, systems, techniques and articles are also described.

20 Claims, 9 Drawing Sheets

(51) Int. Cl.
*G06N 20/20* (2019.01)
*G06F 11/30* (2006.01)
*G06F 11/34* (2006.01)
*G06N 5/04* (2023.01)

(52) U.S. Cl.
CPC .............. *G06N 5/04* (2013.01); *G06N 20/20* (2019.01); *G06F 2221/033* (2013.01)

(56) References Cited

U.S. PATENT DOCUMENTS

| | | | | |
|---|---|---|---|---|
| 10,235,511 | B2* | 3/2019 | Frempong | H04L 63/0861 |
| 10,643,166 | B2* | 5/2020 | Anderson | G06F 21/604 |
| 11,336,669 | B2* | 5/2022 | Bazalgette | H04L 63/1441 |
| 2003/0154406 | A1* | 8/2003 | Honarvar | G07C 9/37 713/153 |
| 2009/0028444 | A1* | 1/2009 | Hwang | G06K 9/6256 382/224 |
| 2009/0076966 | A1* | 3/2009 | Bishop | G06Q 20/363 705/67 |
| 2011/0279228 | A1* | 11/2011 | Kumar | G09B 7/00 340/5.83 |
| 2012/0254333 | A1* | 10/2012 | Chandramouli | G06F 40/10 709/206 |
| 2012/0303798 | A1* | 11/2012 | Crowell | G06F 11/3055 709/224 |
| 2014/0136940 | A1* | 5/2014 | Breslau | G06F 40/177 715/227 |
| 2014/0272882 | A1* | 9/2014 | Kaufman | G09B 5/065 434/308 |
| 2017/0300679 | A1* | 10/2017 | Jaeh | G06F 21/32 |
| 2018/0225982 | A1* | 8/2018 | Jaeh | G09B 5/00 |
| 2019/0199759 | A1* | 6/2019 | Anderson | G06Q 50/20 |
| 2019/0311098 | A1* | 10/2019 | Baldwin | G06F 21/32 |
| 2019/0311099 | A1* | 10/2019 | Baldwin | G06F 7/02 |
| 2019/0311260 | A1* | 10/2019 | Baldwin | G06N 3/08 |
| 2019/0311261 | A1* | 10/2019 | Baldwin | G06N 3/049 |
| 2019/0340949 | A1* | 11/2019 | Meisner | G09B 5/04 |
| 2020/0174630 | A1* | 6/2020 | Rosenberg | G06F 3/013 |

OTHER PUBLICATIONS

Deane, Paul; Using Writing Process and Product Features to Assess Writing Quality and Explore How Those Features Relate to Other Literacy Tasks; Educational Testing Service, Research Report RR-14-03; Jun. 2014.

Deane, Paul, O'Reilly, Tenaha, Chao, Szu-Fu, Dreier, Kelsey; Writing Processes in Short Written Responses to Questions Probing Prior Knowledge; Educational Testing Service, Research Report RR-18-39; Dec. 2018.

Deane, Paul, Roth, Amanda, Litz, Anna, Goswami, Vishal, Steck, Fred, Lewis, Mahlet, Richter, Theresa; Behavioral Differences Between Retyping, Drafting, and Editing: A Writing Process Analysis; Educational Testing Service, Research Memorandum RM-18-06; Jul. 2018.

Deane, Paul, Zhang, Mo; Exploring the Feasibility of Using Writing Process Features to Assess Text Production Skills; Educational Testing Service, Research Report RR-15-26; Dec. 2015.

Guo, Hongwen, Deane, Paul, van Rijn, Peter, Zhang, Mo, Bennett, Randy; Modeling Basic Writing Processes From Keystroke Logs; Journal of Educational Measurement, 55(2); pp. 194-216; Summer 2018.

Monrose, Fabian, Rubin, Aviel; Keystroke Dynamics as a Biometric for Authentication; Future Generation Computer Systems, 16(4); pp. 351-359; Feb. 2000.

Sinharay, Sandip, Zhang, Mo, Deane, Paul; Prediction of Essay Scores From Writing Process and Product Features Using Data Mining Methods; Applied Measurement in Education, 32(2); pp. 116-137; Apr. 2019.

Walker, Steven; Biometric Selection: Body Parts Online; SANS Institute—Information Security Reading Room; 2002.

Zhang, Mo, Bennett, Randy, Deane, Paul, van Rijn, Peter; Are There Gender Differences in How Students Write Their Essays? An Analysis of Writing Processes; Educational Measurement: Issues and Practice, 38(2); pp. 14-26; Summer 2019.

Zhang, Mo, Bennett, Randy, Deane, Paul, van Rijn, Peter; Are There Group Differences in Essay-Writing Processes?; Paper presented at the CCSSO National Conference on Student Assessment; Philadelphia, PA; Jun. 2016.

Zhang, Mo, Deane, Paul; Process Features in Writing: Internal Structure and Incremental Value Over Product Features; Educational Testing Service, Research Report RR-15-27; Dec. 2015.

Zhang, Mo, Hao, Jiangang, Li, Chen, Deane, Paul; Classification of Writing Patterns Using Keystroke Logs; Quantitative Psychology Research; pp. 299-314; 2016.

Zhang, Mo, Zou, Danjie, Wu, Amery, Deane, Paul, Li, Chen; An Investigation of Writing Processes Employed in Scenario-Based Assessment; Ch. 17 in Understanding and Investigating Response Processes in Validation Research; pp. 321-339; 2017.

Zhong, Yu, Deng, Yunbin, Jain, Anil; Keystroke Dynamics for User Authentication; Paper presented at IEEE Computer Society Conference on Computer Vision and Pattern Recognition Workshops; pp. 117-123; 2012.

* cited by examiner

BEHAVIOR-BASED ELECTRONIC ESSAY ASSESSMENT FRAUD DETECTION

CROSS-REFERENCE TO RELATED APPLICATIONS

The current subject matter claims priority to U.S. Pat. App. Ser. No. 62/814,955 filed on Mar. 7, 2019, the contents of which are hereby fully incorporated by reference.

TECHNICAL FIELD

The subject matter described herein relates to enhanced security techniques for confirming an identity of an examinee of a computer-based essay assessment based on behavior patterns exhibited by the examinee.

BACKGROUND

Testing related fraud continues to be a significant problem with a common scenario being for a person to assume the identity of another individual at a testing center (whether proctored or at a dedicated computer center). Detection of such fraudulent activities remains difficult given the large number of test takers across large number of testing sites.

SUMMARY

In a first aspect, biometric keystroke measure data derived from a computer-implemented long form examination taken by an examinee is received. Features are the extracted from the biometric keystroke measure data for the examinee. A similarity value is then determined, using one or more of a direct distance approach or a machine learning approach, for the extracted features relative to features extracted from biometric keystroke measure data derived from each of a plurality of other examinees while taking the long form examination. At least one of the determined similarity values is then identified having a value above a pre-defined threshold, the pre-defined threshold indicating a likelihood of the examinee being the same as one of the other examinees. Data can then be provided that characterizes the identification.

The providing can include one or more of: causing the data characterizing the identification to be displayed in an electronic visual display, storing the data characterizing the determination in physical media, loading the data characterizing the determination into memory, or transmitting the data characterizing the identification to a remote computing system.

The features can be derived from feature sets including: writing features, digraph features, combination of writing and diagraph features, principal components of writing features, or principal components of digraph features.

The direct distance approach can uses a similarity measure to determine the similarity values. The similarity measure can, for example, be cosine similarity and the similarity values are based on distances between determined similarity values for each of a plurality of different feature sets. With such an arrangement, an equal error rate can be computed based on the distances.

The machine learning approach can use various types of machine learning models (including an ensemble of models) including a gradient boosted decision tree (GBDT).

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides techniques for more accurately confirming the identity of examinees of long form written tests with reduced computing resource consumption (e.g., CPU, memory, I/O, etc.) as compared to conventional techniques.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to enhanced techniques for confirming an identity of an examinee in relation to biometric information captured during the taking of a long form written test such as an essay assessment. Numerous studies were conducted by the current inventors which are detailed below.

With the current subject matter, keystroke logging software can capture the sequence and duration of typing actions when an examinee completes an essay as part of an examination. The longer texts captured in an essay assessment and similar tests allow for more precise measurement of typing dynamics and thus are able to provide keystroke-based biometric measures that outperform conventional techniques. Thus, identifying measures that capture stable characteristics of individual writers in examinee essays as provided herein not only support research into the development of writing fluency but also enable the development of a biometric measure for test security.

In one example, based on examinee keystroke data collected from HiSet®, ETS' high school equivalency test, a preliminary biometric baseline was established for detecting repeated test takers by using features extracted from their writing process logs. With the current subject matter, the entire writing process can be characterized using biometric information, rather than simply using features narrowly focused on characterizing a writer's typing habits, which typically focus on digraphs (the speed of typing particular 2-letter key sequences). Several methods for predicting whether an individual was the same or a different person than the author of a previously submitted essay were assessed. Overall, it was determined that selection of a most stable and predictive subset of writing process features and, in addition, top 10 principal components of the digraph features, an equal error rate of 0.049 was achieved, which is slightly better than a conventional 0.054 benchmark reported in keystroke dynamics literature.

Study 1. In a first study, the extent to which features designed to measure test-takers' general writing performance could be repurposed to distinguish repeaters from non-repeaters was examined.

Test Takers. For this analysis, operational HiSet® test taker data collected between Sep. 17, 2012 and Aug. 31, 2018 was used. During this period, 30,788 test takers wrote at least one essay with at least one keystroke event. Some test takers took the test multiple times (see Repeaters), so the total number of collected essays was 34,245. The population that takes the Hi Set® examination primarily consists of adults who did not originally receive a high school diploma and need to establish that they have achieved a level of performance equivalent to that of a high school graduate.

Repeaters. Most of the test takers took the HiSet® test only once during a 12 month data collection window. However, during the same period, a subset of the test takers (2,879) took the test multiple times. For convenience, such test takers are referred to herein as repeaters. Most of the repeaters (2,395 out of 2,879) took the test twice, with the remaining 31,850 test takers having three or more attempts. For the study, the first and second test form for each repeater were analyzed while additional attempts were ignored.

Materials. Individuals taking the HiSet® writing examination sit for a two-hour test consisting of one essay question and fifty multiple-choice questions, though for the purpose of the analysis, only the essay portion was analyzed. Different individuals were randomly assigned different (but equated) forms; in our data, there were 12 different essay prompts. Test-takers could allocate their time within the 2-hour block as they chose, and could freely navigate among the questions, so in some cases, a writer might write an initial draft, answer other questions, but later come back to revise their answer. The essay task typically involved a stimulus reading providing information about a topic of interest, and question prompt that identified the writing assignment.

Procedure. ETS® test collection software recorded the final essay responses and a log of individual keystroke actions for examinees taking the HiSet® writing examination. The raw log was processed to extract features designed to capture the following characteristics of writer's performance:

The number, latency, speed, and total time spent for specific typing events (measured by log keystroke latency in milliseconds, and in keystrokes per second), including pauses before inserting characters within a word, between words, between sentences, and between paragraphs;

The number, latency, speed, and total time for initial and repeated backspacing events, cut and paste events, and edits that involved a jump from one location in the text to another;

Measures of the extent to which words were edited, and whether they were correctly spelled before and after editing;

Measures of fluency of typing, defined in terms of bursts of text production (sequences of keystrokes produced rapidly without a long pause), including the number and length of each type of burst in the test-taker's response.

Multiple definitions were applied for many of the features. For instance, bursts of typing could be defined either for all keystrokes, or only for insertion keystrokes, or by varying the length of the pause that defined the end of a burst. Various statistical summaries were applied to each base feature definition, including raw counts, means, medians, and standard deviations. After all of these variations were applied, a set of 689 writing process features with nonzero variance was obtained.

Some of these features have been shown to be related to the quality of test-takers' final submitted essay. In general, stronger writers are more fluent and accurate, producing longer bursts with shorter latencies and fewer errors and corrections, while showing more evidence of editing and revision behavior. However, some features might be strongly correlated with score, but not be stable across occasions or tasks, so the first concern was to identify features stable enough to distinguish between test takers, as measured by the strength of correlation across multiple essay-writing occasions, and then to determine how useful those features were in distinguishing repeater essay pairs (where two essays were written by the same person) from non-repeater essay pairs (where two essays were written by different persons.)

Within-Person Feature Correlations. Because the HiSet® writing test includes only one essay task, the utilized data only included one keystroke log for test takers who took the test once. On the other hand, the repeaters wrote (at least) two essays, which provided an opportunity to examine how process features correlate across essays written by the same writer. Therefore, the repeater data was used to examine the within-person feature correlation. A Pearson correlation coefficient was calculated for each of the 689 features with non-zero variance, and the associated magnitude and bivariate distributions were also examined.

Classification of Repeaters based on Process Features. The feasibility of using the writing process features to determine whether a pair of essays was written by the same or different writers was explored. In this study, a gradient boosting classifier was built that was based on a logistic regression model using selected process features.

Non-repeater pair data was generated by randomly selecting 27500 non-repeaters and pairing them to obtain 13750 non-repeater pairs. These 13750 non-repeater pairs were only a tiny fraction of all possible pairs. Not all possible pairs were analyzed due to computational burden. All of the 2879 repeaters were used as repeater pairs. The classification task was then to discriminate the repeater essays from essays written by the random pairs based on a selected subset of process feature values.

Depending on computing resource availability, not all of the available process features need be utilized. For example, a pre-selected a subset of the process features can be used in the following manner. First, features with zero missing rate among the non-repeater pairs and repeater pairs were considered. The Pearson correlation coefficient was calculated for each selected feature from the non-repeater pair data, and excluded features that had lower repeater-pair correlations than the maximum correlation observed in the non-repeater pairs. Applying these two steps left a total of 359 features, all of which were used to build the classifier.

With the 359 selected features, a gradient boosting classifier was trained in the following manner. First, the squared difference of each feature within each pair was calculated and the resulting vector of squared differences was used as the input. The classifier was trained on a randomly subset of the data that had 11,000 random pairs and 2,303 repeater pairs (i.e., 80 percent of the entire data set), and evaluated on the remaining data set with 2750 random pairs and 576 repeater pairs. The outcome variable was the binary classification into a random pair (0) or a repeater pair (1). A stochastic gradient boosting classifier was then trained with 100,000 iterations, the terminal node size of 5, the interaction depth of 3, and the learning rate of 0.001. After the training, the relative importance of each process feature was examined, and the classifier performance based was evaluated on classification errors and receiver operating characteristic (ROC) curves.

Figure 1:
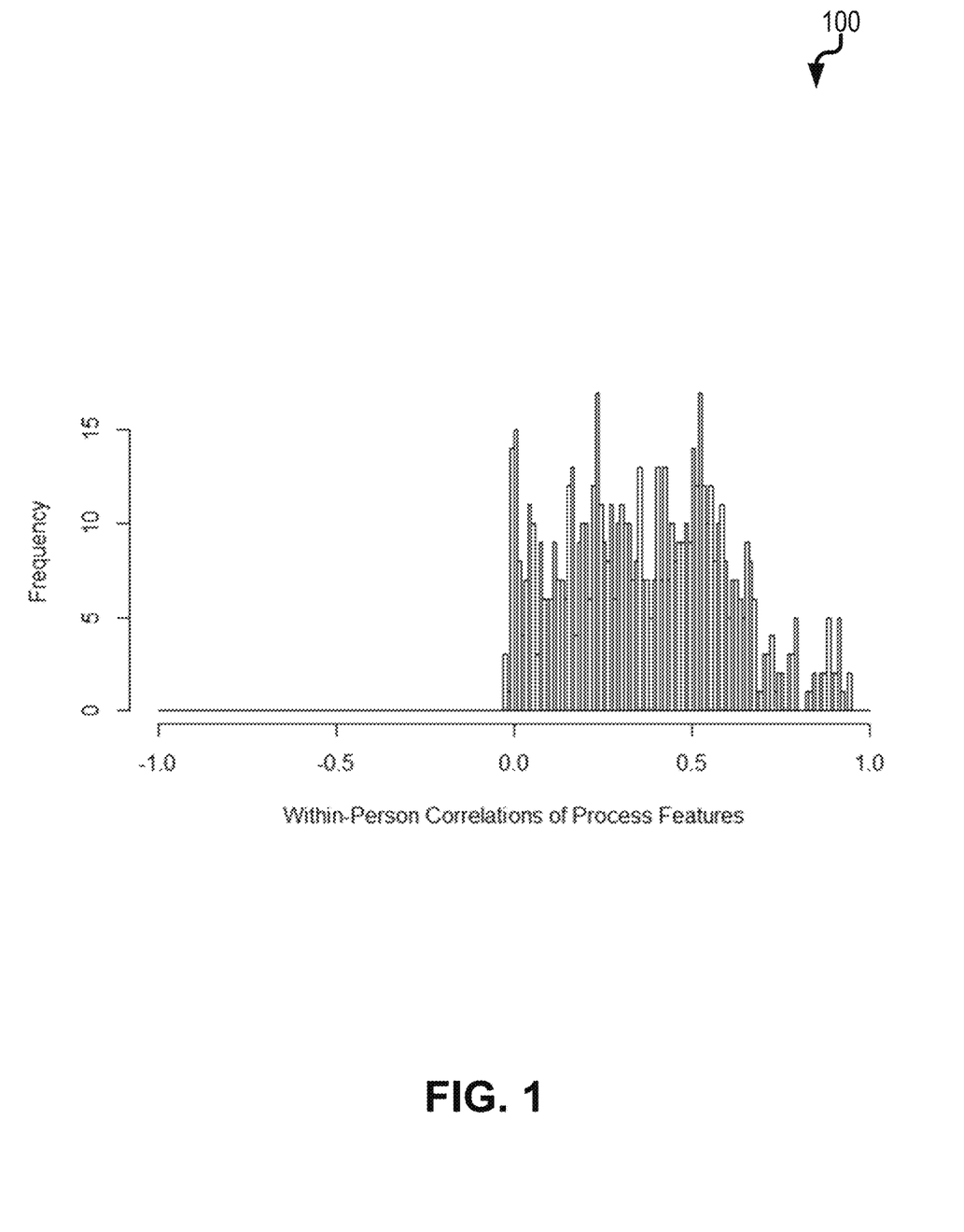
FIG. 1 is a diagram illustrating within-person correlations of features.
Figure 2:
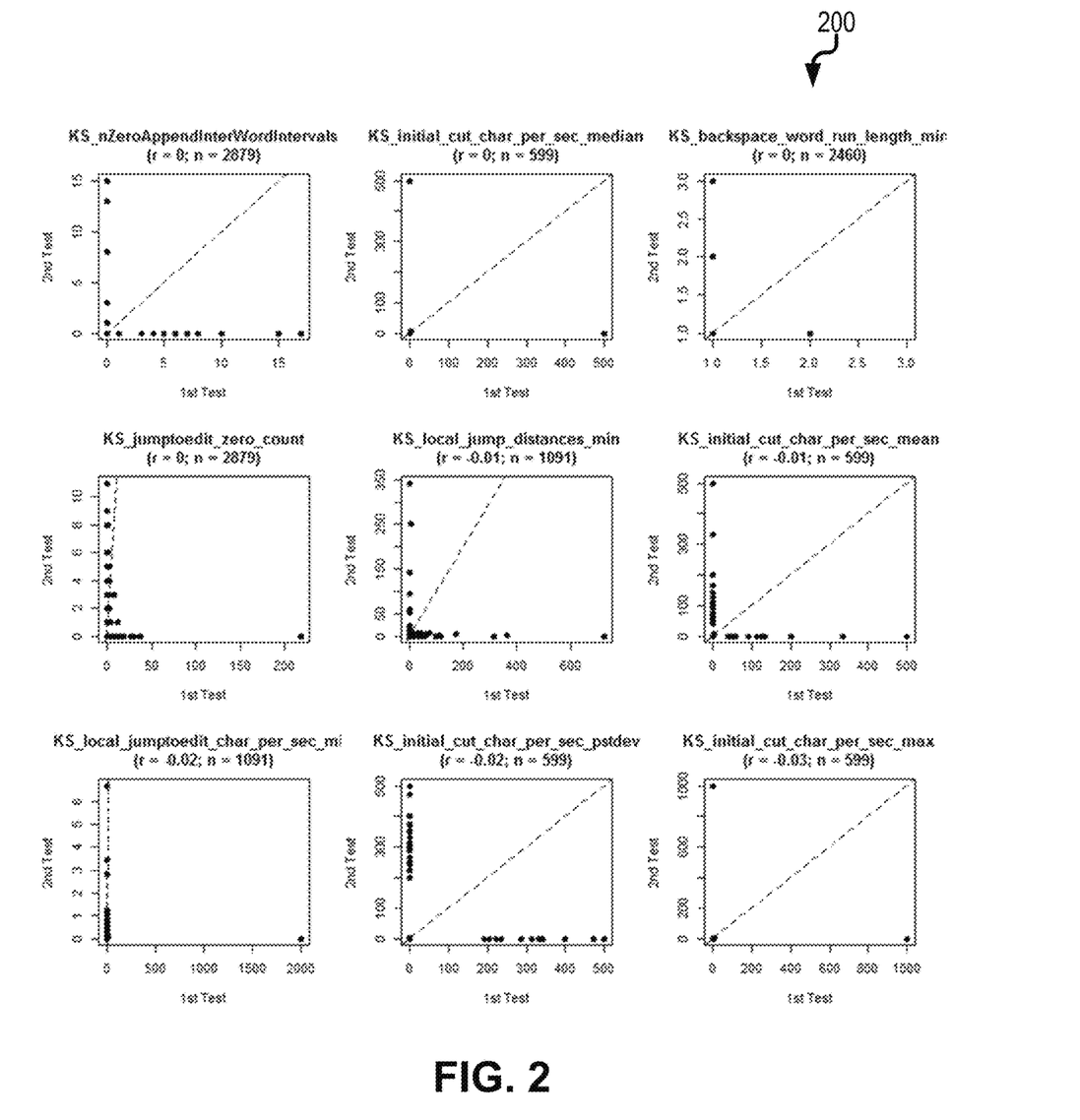
FIG. 2 is a diagram illustrating bivariate scatter plots of nine features with smallest correlations.

Within-Person Correlations. The distribution of within-person correlation coefficients from the repeaters is illustrated in diagram 100 of FIG. 1. As expected, most of the features showed positive within-person correlations. There were a small number of negative coefficients. Bivariate scatter plots of nine features with smallest correlations are shown in diagram 200 of FIG. 2.

Figure 3:
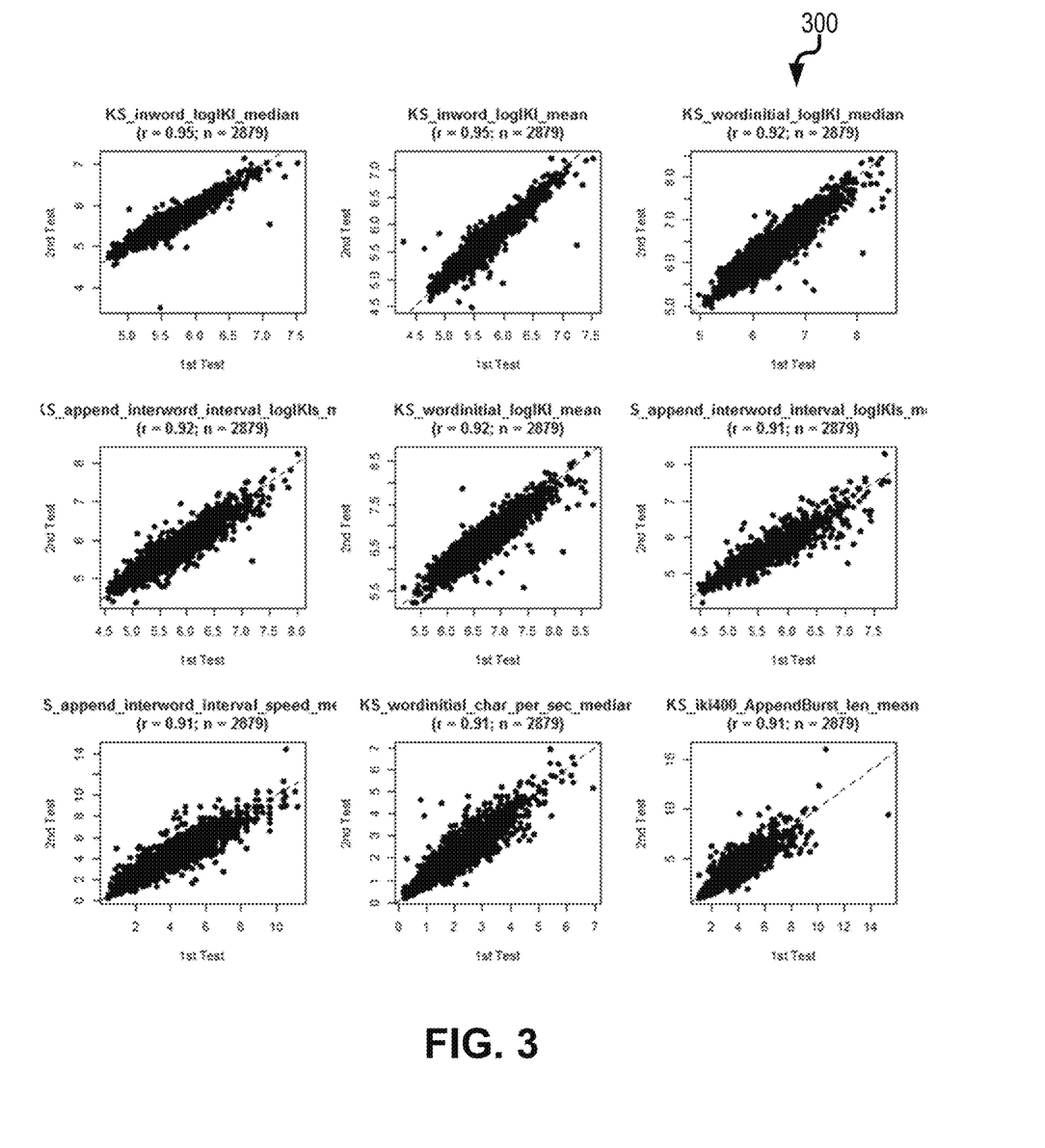
FIG. 3 is a diagram illustrating bivariate scatter plots of top nine features in terms of the estimated correlation coefficients.

There were several features that showed almost perfect within-person correlations. Diagram 300 of FIG. 3 presents the bivariate scatter plots of top 9 features in terms of the estimated correlation coefficients. These features were mostly capturing the speed of typing within words and/or while test takers were writing in bursts. Figure R3 shows that, not only the feature values of the two tests were linearly related, but the values from the first and second tests were quite comparable: most of the data points were concentrated around the 45 degree line with a few outliers.

Repeater Classification. The relative influence of each feature for the classification task was examined. Table 1 below gives the top 20 features in their relative influence.

TABLE 1

| Feature name | Feature Description | Relative Influence |
|---|---|---|
| KS_inword_char_per_sec_median | Median speed of typing inside a word, in characters per second | 19.248 |
| KS_wordinitial_char_per_sec_median | Median speed of typing the first character of a word, in characters per second | 9.827 |
| KS_iki200_AppendBurst_len_mean | Mean length in characters of bursts of append keystrokes where no pause is longer than 200 milliseconds | 9.409 |
| KS_wordinitial_logIKI_median | Median duration of word initial keystrokes in log milliseconds | 4.102 |
| KS_iki400_AppendBurst_len_mean | Mean length in characters of bursts of append keystrokes where no pause is greater than 400 milliseconds | 3.349 |
| KS_logInitialBackspaceEvent | Proportion of keystrokes that consist of an initial backspace, on a logit scale | 3.158 |
| KS_iki600_AppendBurst_len_mean | Mean length in characters of bursts of append keystrokes where no pause is greater than 600 milliseconds | 2.598 |
| KS_inword_logIKI_mean | Mean duration of in-word keystrokes in log milliseconds | 2.052 |
| KS_wordinitial_logIKI_mean | Mean duration of word-initial keystrokes in log milliseconds | 1.976 |
| KS_wordinitial_char_per_sec_pstdev | Standard deviation of speed of word initial keystrokes | 1.863 |
| KS_inword_char_per_sec_max | Maximum speed of inword keystrokes | 1.781 |
| KS_logitWhitespaceAfterLineBreakEvent | Proportion of keystrokes that consist of whitespace after a linebreak (e.g., paragraph indenting), on a logit scale | 1.612 |
| KS_inword_logIKI_pstdev | Standard deviation of duration of in word keystrokes, measured in log milliseconds | 1.188 |
| KS_iki7SD_All ActionBurst_count | Number of bursts of text production where all keystrokes are included in the burst and burst boundaries are 7 standard deviations longer in duration than the individual's median keystroke pause time | 1.064 |

TABLE 1-continued

| Feature name | Feature Description | Relative Influence |
|---|---|---|
| KS_totalElsewhereAfterTime | Total time the test-taker spent on the rest of the test other than the essay | 0.966 |
| KS_totalLineBreakTime | Total time the test-taker spent pausing before inserting a line break | 0.832 |
| KS_logitLineBreakTime | Proportion of total time spent pausing before a linebreak, on a logit scale | 0.722 |
| KS_iki400_AllActionBurst_len_mean | Mean length in characters of bursts where all keystrokes count as part of the burst, and bursts end on pauses longer than 400 milliseconds | 0.649 |
| KS_iki200_AllActionBurst_len_mean | Mean length in characters of bursts where all keystrokes count as part of the burst, and bursts end on pauses longer than 200 milliseconds | 0.648 |
| KS_inword_logIKI_median | Median duration of in word keystrokes, measured in log milliseconds | 0.626 |

It is clear that the most influential features involved the speed of typing.

Figure 4:
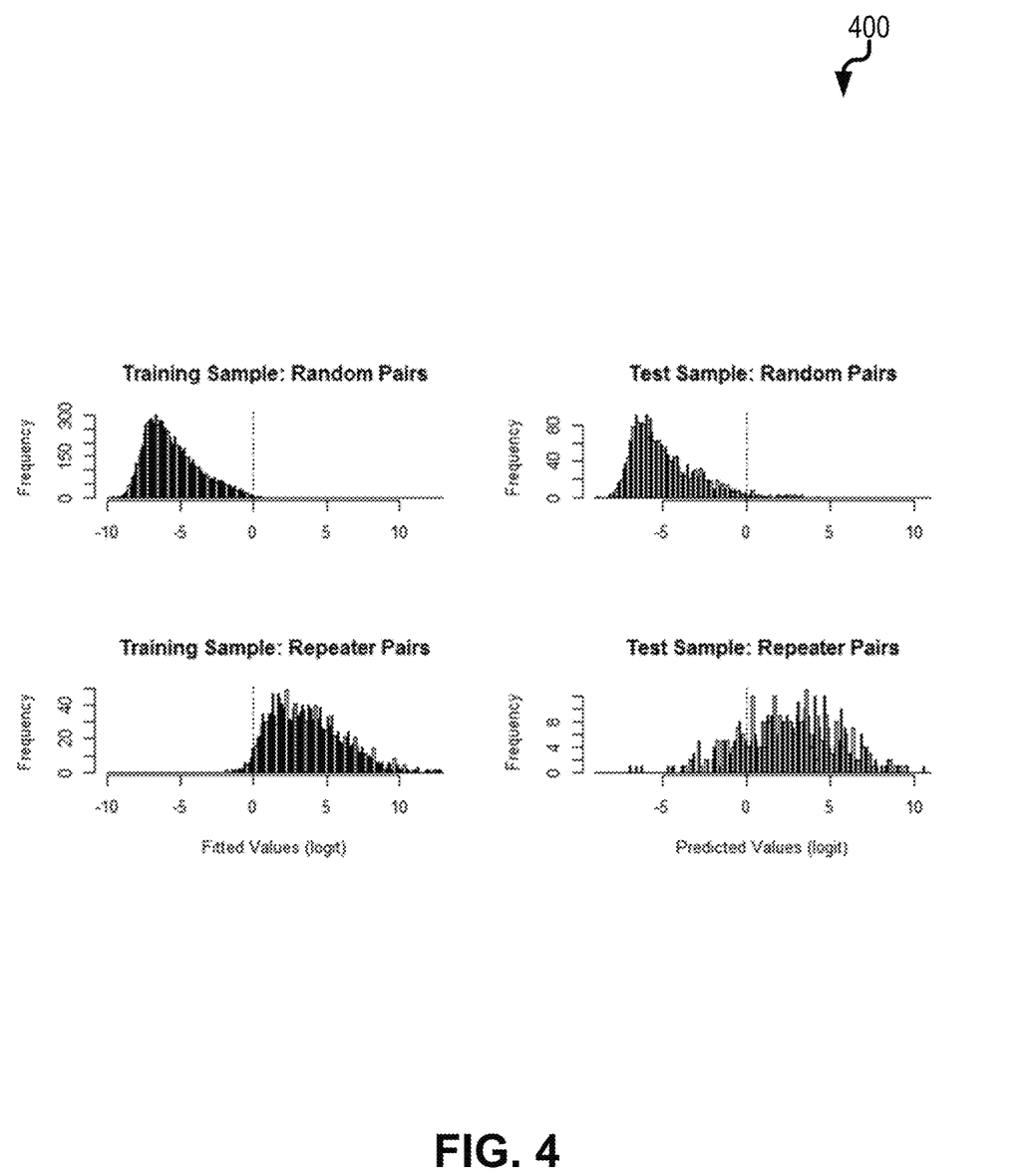
FIG. 4 is a diagram illustrating fitted value distributions for both training and test sets on the logit scale.

The fitted values from the trained classifier for non-repeater and repeater pairs was then examined. Diagram 400 of FIG. 4 gives the fitted value distributions for both training and test sets (on the logit scale).

As illustrated, the classifier performed better on the training set than on the test set. However, the pattern of the classification performance was quite comparable in that, for both cases, the classifier struggled to contain the left tail of the repeater pair distribution. One possible reason for this struggle is the small sample size for the repeater pairs: although the overall sample size of the training set was not particularly small, most of them (more than 80 percent) were non-repeater pairs and there were only 454 repeater pairs. Using a larger data set with more repeater pairs might address this issue.

A logit value of 0 was used (corresponding to the classification probability of 0.5) as the cutoff for classification to obtain confusion tables. The resulting confusion tables are provided in Table 2 below.

TABLE 2

| | Train Fitted: Random | Train Fitted: Repeater | Test Predicted: Random | Test Predicted: Repeater |
|---|---|---|---|---|
| True: Random | 10993 | 57 | 2689 | 106 |
| True: Repeater | 7 | 2246 | 61 | 470 |

The overall classification accuracy in the training and test sets were 0.995 and 0.95, respectively. With this neutral cutoff, the classifier showed higher precision (0.997 on the training set and 0.885 on the test set) than recall (0.975 on the training set and 0.816 on the test set). This relationship is indicated by the distributions shown earlier: most of the errors were due to the failure to contain the left tail of the repeater pairs.

Figure 5:
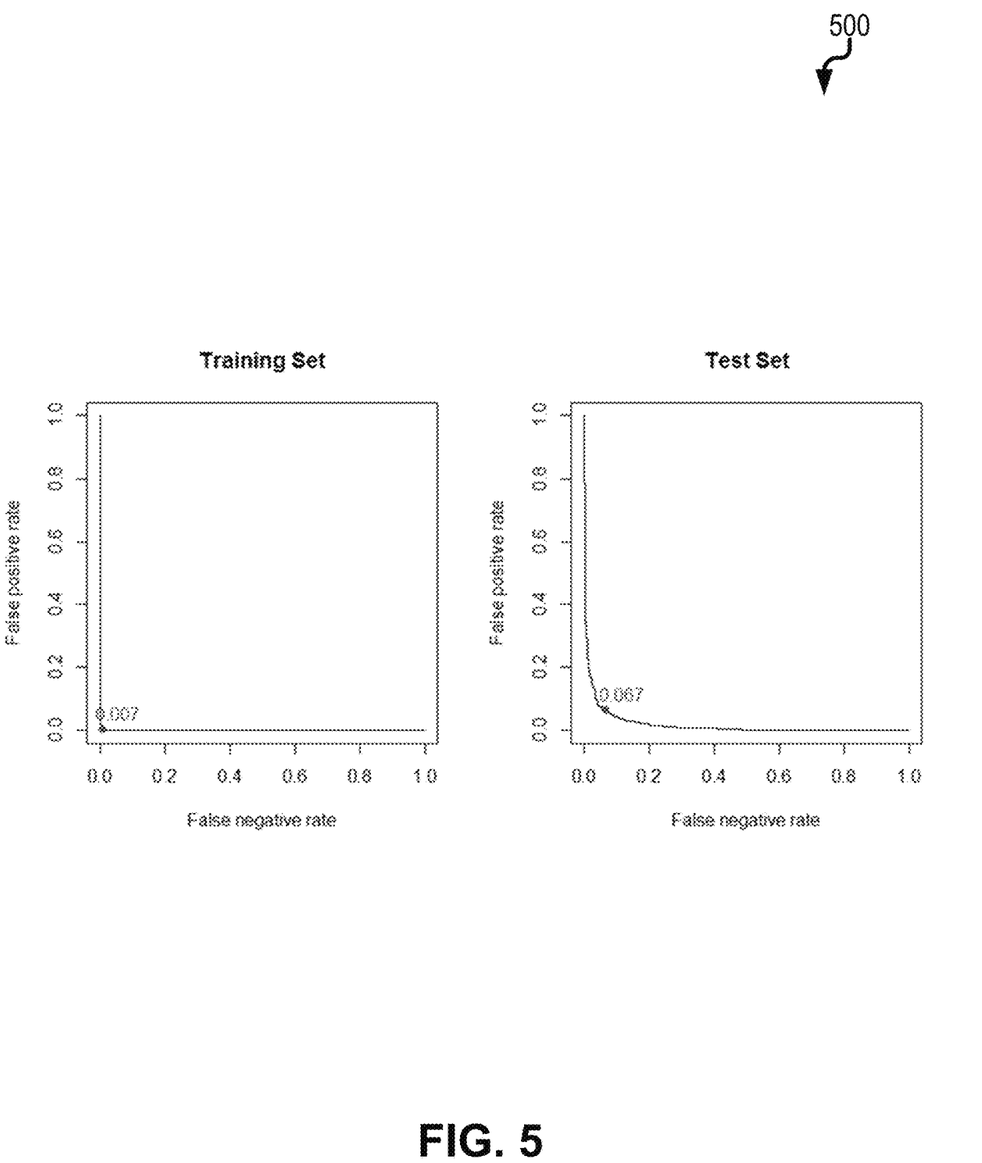
FIG. 5 is a diagram illustrating false positive and false negative errors and equal error rates.

The false positive and false negative errors and equal error rates are illustrated in diagram 500 of FIG. 5.

In the initial study, the performance of the classifier on the training set (0.067) was slightly below the industry standard for keystroke data used as a biometric classifier (0.054). However, the features used in the study were not designed to capture fine details of the typing process that might reflect different typing habits, such as the difference between a touch typist and a hunt-and-peck typist. It was judged likely that performance could be approved above this level by using additional features based on keystroke digraphs—e.g., the speed or latency with which individuals produce specific key combinations.

Study 2. A second study was undertaken which had a similar dataset as in Study 1 to which slightly different rules were used to clean the data, resulting in a dataset with 32,104 test takers, of whom 3,110 were repeaters. A random sample of non-repeaters was created by randomly choosing 3,110 test takers who only took the test once. The following analyses are based on a subset of the data consisting of the repeaters and the matched random sample of non-repeaters.

Additional Typing Features.

Two sets of keystroke features extracted from the keystroke logs were considered as follows.

1. The writing process features used in Study 1.
2. Digraph features consist of the summary statistics of the time interval between two adjacent letters.
3. In addition to the above two feature sets, principal components were created for each feature set respectively. For the writing process features, most examinees have non-zero values. However, for the digraph features, it can be sparse. So the PCs of the digraph features may be more important to consider than those for the writing features.

Analysis Plan. Two general approaches were considered in study 2.

The first approach was a direct distance approach that establishes a distance measure between pairs of sessions based on the keystroke features, and then examine how the distribution of the distances are different between the repeater pairs and the random pairs. Based on the distance measure, an equal error rate (EER) can be computed based on the corresponding ROC curve. This EER will provide a ballpark estimate of separability between the repeater and random pairs. After comparing the distance metrics, it was determined that cosine similarity performs the best however different similarity measures can be utilized.

The second approach was a machine learning approach that applies machine learning methods to the difference (L1 or L2 does not lead to significant difference) of each keystroke feature from the pair of sessions to differentiate whether the pairs are from repeaters or random test takers.

Direct Distance Approach. The purpose of the direct distance approach is to identify the minimum set of features that can help to differentiate the repeater sample and random sample. Using fewer dimensions is also important to ensure that the distance measure is discriminative. After several rounds of experimentation, a subset of features was arrived at as follows:

Median writing features whose correlations among repeaters are above 0.85

Top give principal components from the digraph features.

As used herein, this example feature set is referred to as a golden feature set herein. The selected features are shown in Table 3.

TABLE 3

| 0 | inword_logIKl_median | 0.940439 |
|---|---|---|
| 1 | wordinitial_char_per_sec_median | 0.904513 |
| 2 | wordinitial_logIKl_median | 0.909188 |
| 3 | initial_backspace_char_per_sec_median | 0.897256 |
| 4 | initial_backspace_logIKl_median | 0.883315 |
| 5 | append_interword_interval_speed_median | 0.909367 |
| 6 | append_interword_interval_logIKls_median | 0.904863 |
| 7 | Di_PC_1 | 0.946693 |
| 8 | Di_PC_2 | 0.772631 |
| 9 | Di_PC_3 | 0.735718 |
| 10 | Di_Pc_4 | 0.650841 |
| 11 | Di_PC_5 | 0.673891 |

Figure 6:
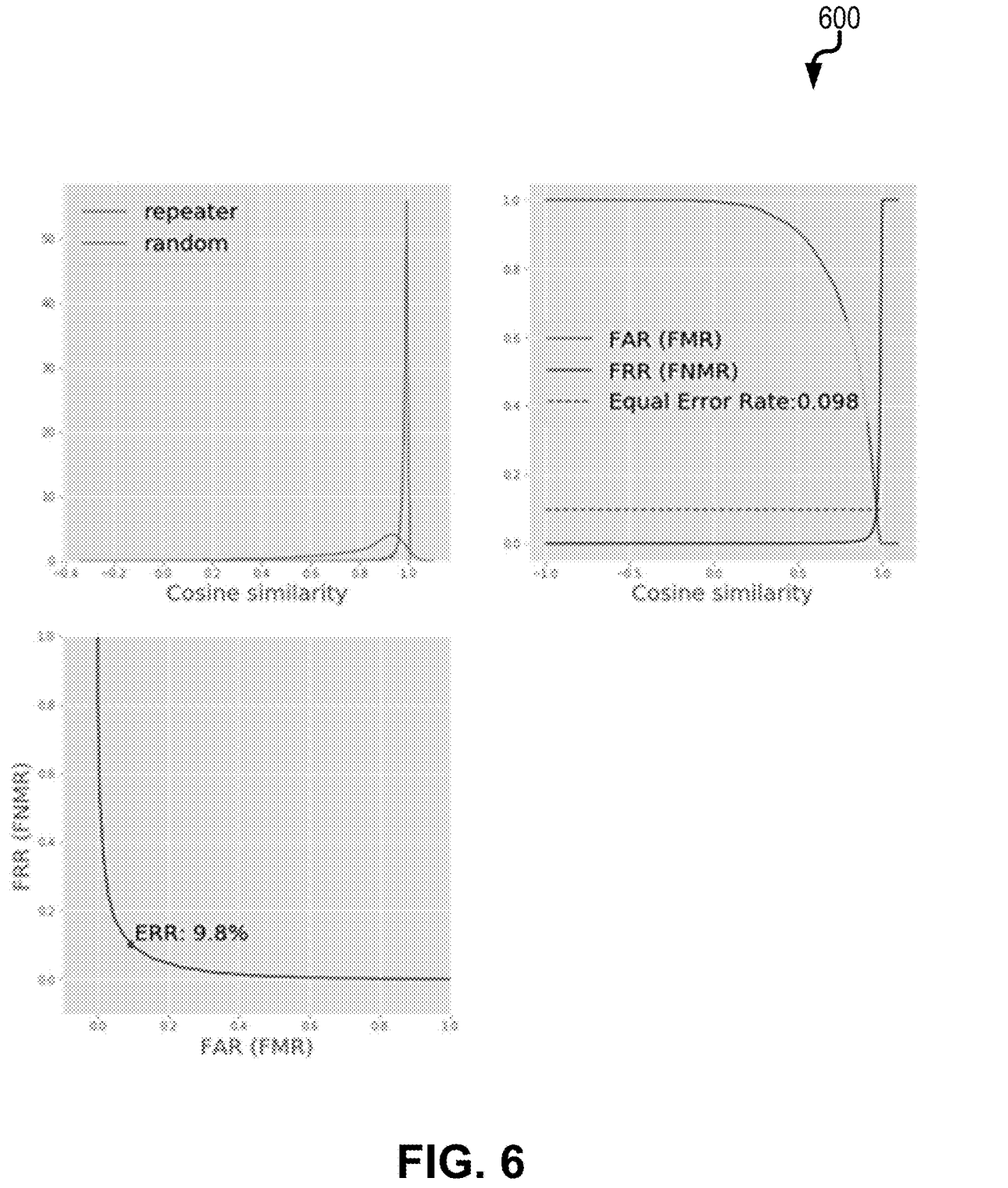
FIG. 6 is a diagram illustrating distribution of cosine similarity and equal error rate.

Based on this subset of features, an ERR of 0.098 was obtained. Diagram 600 of FIG. 6 illustrates the results in more details.

In Table 4, the performance of different feature sets/combinations with the resulting Equal Error Rate is provided.

TABLE 4

Performance using the direct distance (cosine similarity) approach for different feature sets and combinations

| Feature set/combination | ERR |
|---|---|
| All writing features only | 0.314 |
| All digraph features only | 0.489 |
| All writing and digraph features | 0.314 |
| All PCs from writing features | 0.162 |
| All PCs from digraph features | 0.208 |
| Top 5 PCs from writing features and top 5 PCs from digraph features | 0.18 |
| Golden feature | 0.098 |

Machine Learning Approach. As the ML approach will automatically adjust the weight of different features, it is not necessary to throw away features for better performance. As such, all obtained keystroke features (e.g., writing features and digraph features, etc.) can be considered to build a baseline for the performance. After comparing the performance of various machine learning algorithms, the Gradient Boosted Decision Tree (GBDT) gives the best results based on four-fold cross-validation; however it will be appreciated that other types of ML models can be utilized herein. The result using all writing and the top 10 PCs from the digraph features under GBDT algorithm achieves the best ERR of 0.049, which is slightly better than the reported value of 0.054 in the literature about the biometrics based on keystroke dynamics.

Figure 7:
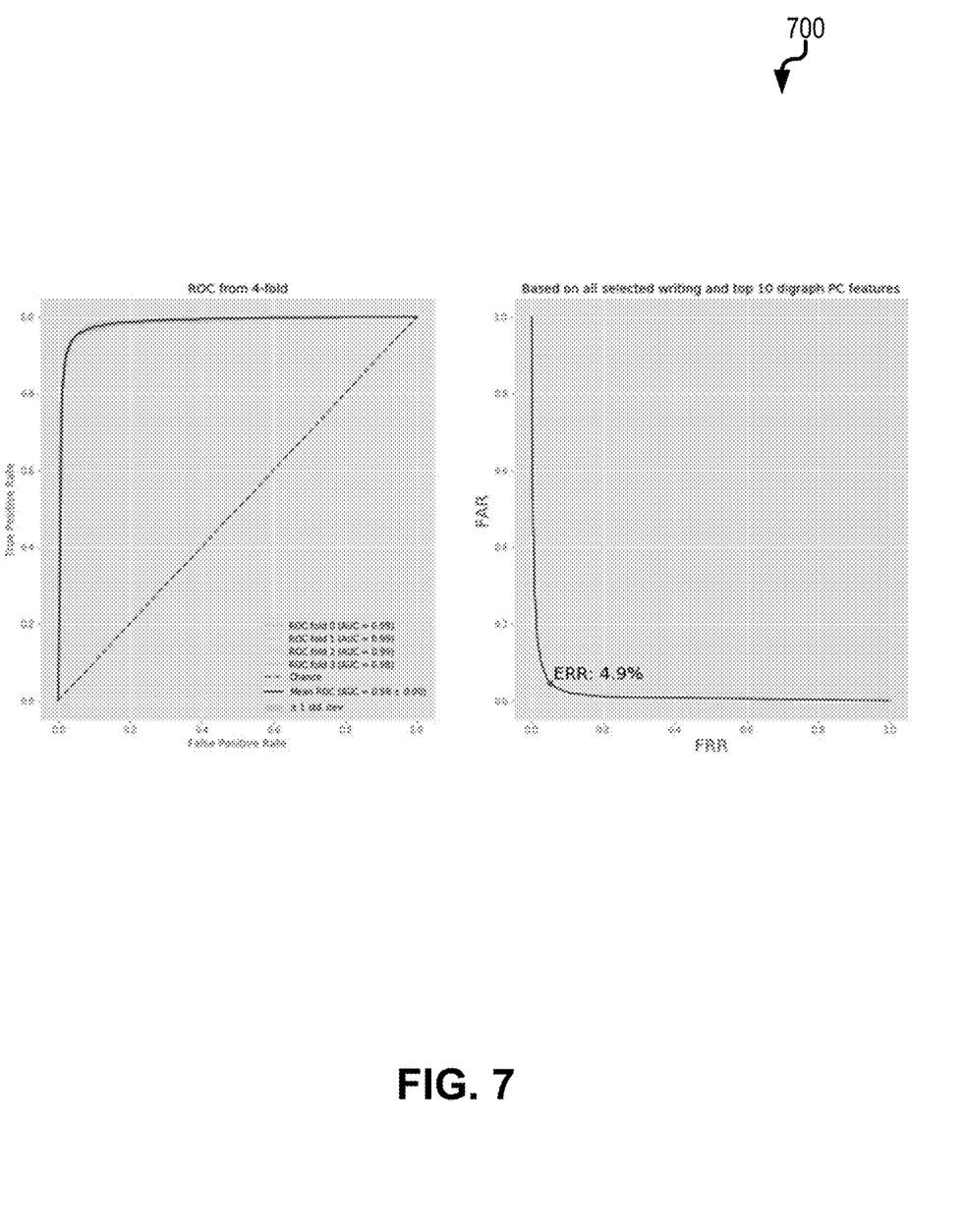
FIG. 7 is a diagram illustrating best equal error rate using a machine learning model.

FIG. 7 is a diagram 700 illustrating the best ERR using GBDT with all writing and top 10 PCs from the digraph features based on 4-fold cross-validation.

To get a general sense of how other features perform in this ML approach, sample results are provided below in Table 5.

TABLE 5

Comparison of the performance of different features in the ML approach (using GBDT) based on 4-fold cross validation.

| Feature set/combination | ERR |
|---|---|
| All writing features only | 0.068 |
|  | 0.068 |
| All digraph features only | 0.136 |
| All PCs from writing features | 0.201 |
| All PCs from digraph features | 0.107 |
| All PCs from writing features and all PCs from digraph features | 0.094 |
| All writing and digraph features | 0.054 |
| All writing features and top 5 PCs from digraph features | 0.052 |
| All writing features and top 10 PCs from digraph features | 0.049 |
| Golden feature | 0.079 |

The current subject matter is informed by the results from Study 2. The lowest equal error rate obtained was 0.049, which is better than that reported in the biometric literature for other keystroke applications.

Not only can the keystroke-based biometric measures used herein be useful in identifying repeaters vs. nonrepeaters, the current subject matter can also, with an appropriate dataset, be able to can identified true impostors as well as distinguishing repeaters from nonrepeaters. Further, profiles can be obtained for examinees across different examinations so that they such profiles can be used for cross-examination identification/authentication. In some cases, these profiles can be built based on examinee practice tests.

Figure 8:
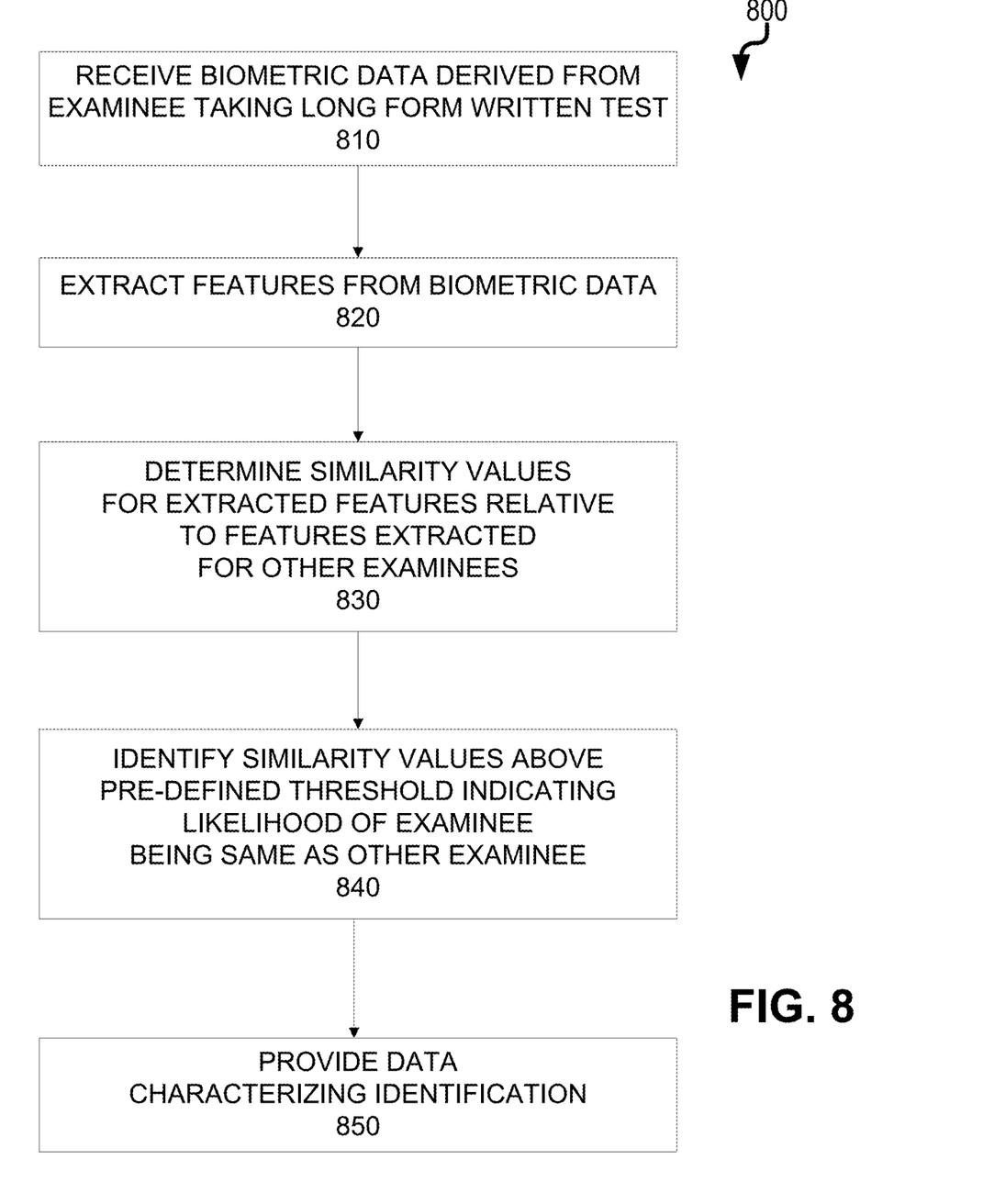
FIG. 8 is a process flow diagram illustrating behavior-based electronic essay assessment fraud detection.

FIG. 8 is a process flow diagram 800 in which, at 810, biometric keystroke measure data derived from a computer-implemented long form examination taken by an examinee is received. Thereafter, at 820, features are extracted from the received biometric keystroke measure data for the examinee. A similarity value is then determined, at 830, for the extracted features relative to features extracted from biometric keystroke measure data derived from each of a plurality of other examinees while taking the long form examination. Such a determination can take different approaches including a direct distance approach, a machine learning model approach, or a combination thereof. Next, at 840, at least one of the determined similarity values having a value above a pre-defined threshold is identified. The pre-defined threshold can indicate a likelihood of the examinee being the same as one of the other examinees. Data can then be provided, at 850, which characterizes the identification.

The providing of data which characterizes the identification can trigger a variety of actions including modifying a workflow associated with the examination of the examinee. For example, further computer-implemented authentication/identification mechanisms can be implemented to determine whether fraud or some other abnormality occurred. The examination can also be declared void and/or subject to human review (as opposed to computer-based grading).

Figure 9:
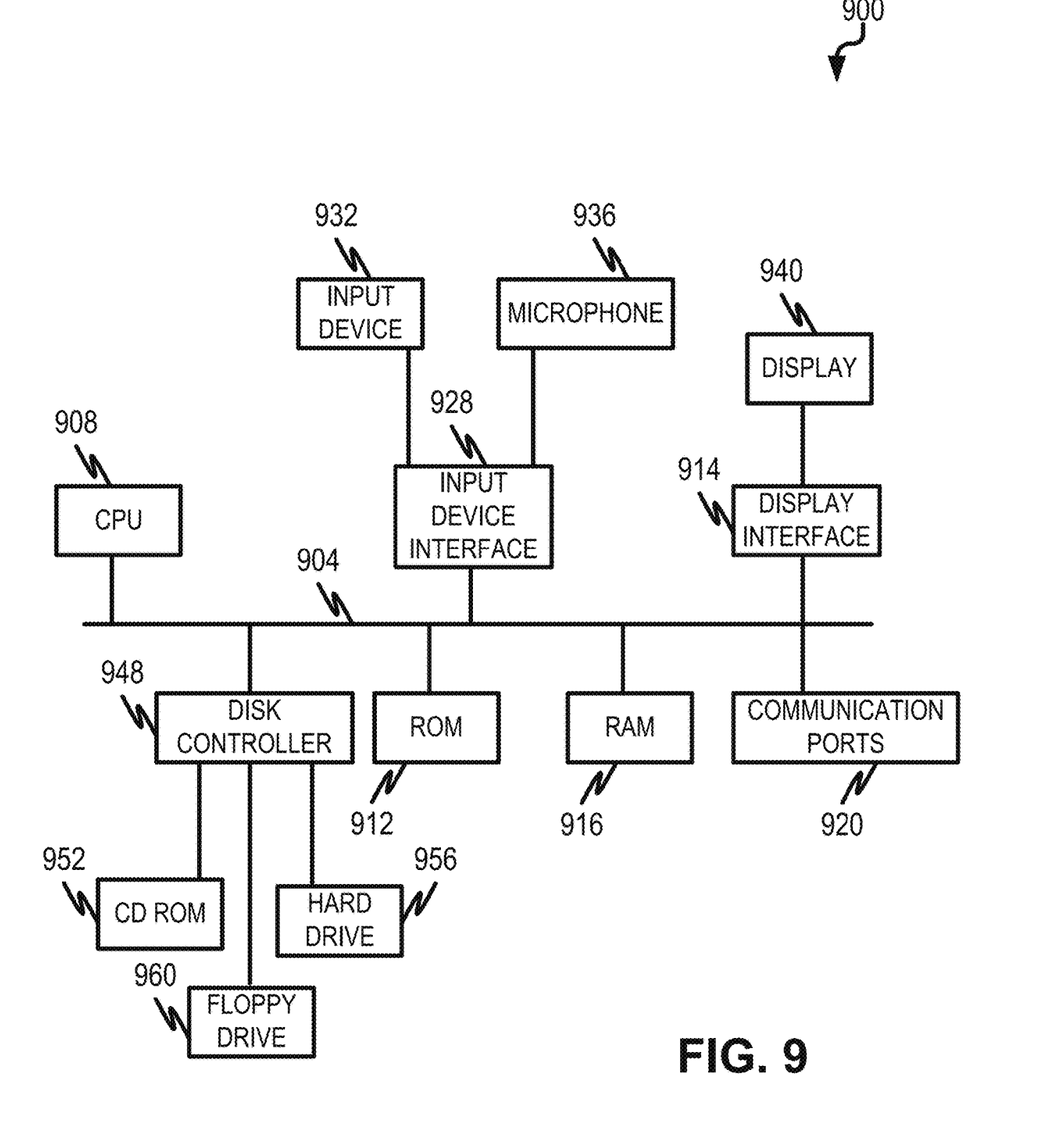
FIG. 9 is a diagram illustrating aspects of a computing device for implementing the current subject matter.

FIG. 9 is a diagram 900 illustrating a sample computing device architecture for implementing various aspects described herein. A bus 904 can serve as the information highway interconnecting the other illustrated components of the hardware. A processing system 908 labeled CPU (central processing unit) (e.g., one or more computer processors/data processors at a given computer or at multiple computers), can perform calculations and logic operations required to execute a program. A non-transitory processor-readable storage medium, such as read only memory (ROM) 912 and random access memory (RAM) 916, can be in communication with the processing system 908 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 948 can interface with one or more optional disk drives to the system bus 904. These disk drives can be external or internal floppy disk drives such as 960, external or internal CD-ROM, CD-R, CD-RW or DVD, or solid state drives such as 952, or external or internal hard drives 956. As indicated previously, these various disk drives 952, 956, 960 and disk controllers are optional devices. The system bus 904 can also include at least one communication port 920 to allow for communication with external devices either physically connected to the computing system or available externally through a wired or wireless network. In some cases, the at least one communication port 920 includes or otherwise comprises a network interface.

To provide for interaction with a user, the subject matter described herein can be implemented on a computing device having a display device 940 (e.g., a CRT (cathode ray tube) or LCD (liquid crystal display) monitor) for displaying information obtained from the bus 904 via a display interface 914 to the user and an input device 932 such as keyboard and/or a pointing device (e.g., a mouse or a trackball) and/or a touchscreen by which the user can provide input to the computer. Other kinds of input devices 932 can be used to provide for interaction with a user as well; for example, feedback provided to the user can be any form of sensory feedback (e.g., visual feedback, auditory feedback by way of a microphone 936, or tactile feedback); and input from the user can be received in any form, including acoustic, speech, or tactile input. The input device 932 and the microphone 936 can be coupled to and convey information via the bus 904 by way of an input device interface 928. Other computing devices, such as dedicated servers, can omit one or more of the display 940 and display interface 914, the input device 932, the microphone 936, and input device interface 928.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:
1. A computer-implemented method comprising:
   capturing, by keystroke logging software, biometric keystroke measure data generated by an examinee typing on a keyboard when writing one or more essays forming part of a long-form examination, the biometric keystroke measure data characterizing a sequence and duration of typing actions by the examinee during the long-form examination;

extracting features from the biometric keystroke measure data for the examinee that characterizing the typing of the examinee;

determining, using a direct distance approach, similarity values for the extracted features relative to features extracted from different biometric keystroke measure data derived from each of a plurality of other examinees while taking the long-form examination;

identifying at least one of the determined similarity values having a value above a pre-defined threshold, the pre-defined threshold indicating a likelihood of the examinee being the same as one of the other examinees that generated the different biometric keystroke measure data; and providing data characterizing the identification.

2. The method of claim 1, wherein the providing comprises one or more of: causing the data characterizing the identification to be displayed in an electronic visual display, storing the data characterizing the determination in physical media, loading the data characterizing the determination into memory, or transmitting the data characterizing the identification to a remote computing system.

3. The method of claim 1, wherein the extracted features comprise one or more of: writing features, digraph features, combination of writing and diagraph features, principal components of writing features, or principal components of digraph features.

4. The method of claim 1, wherein the direct distance approach uses a similarity measure to determine the similarity values.

5. The method of claim 4, wherein the similarity measure is cosine similarity.

6. The method of claim 5, wherein the similarity values are based on distances between determined similarity values for each of a plurality of different feature sets.

7. The method of claim 6 further comprising:
computing an equal error rate based on the distances.

8. The method of claim 1 further comprising:
capturing the biometric keystroke measure data during a time in which the examinee takes the long-form examination on a computing device having a keyboard.

9. A computer-implemented method comprising:
capturing, by keystroke logging software, biometric keystroke measure data generated by an examinee typing on a keyboard when writing one or more essays forming part of a long-form examination, the biometric keystroke measure data characterizing a sequence and duration of typing actions by the examinee during the long-form examination;

extracting features from the biometric keystroke measure data for the examinee;

determining, using a machine learning model trained based on features derived from a population of student responses to the long-form examination, similarity values for the extracted features relative to features extracted from different biometric keystroke measure data derived from each of a plurality of other examinees while taking the long-form examination;

identifying at least one of the determined similarity values having a value above a pre-defined threshold, the pre-defined threshold indicating a likelihood of the examinee being the same as one of the other examinees that generated the different biometric keystroke measure data; and providing data characterizing the identification.

10. The method of claim 9, wherein the providing comprises one or more of: causing the data characterizing the identification to be displayed in an electronic visual display, storing the data characterizing the determination in physical media, loading the data characterizing the determination into memory, or transmitting the data characterizing the identification to a remote computing system.

11. The method of claim 9, wherein the extracted features comprise one or more of: writing features, digraph features, combination of writing and diagraph features, principal components of writing features, or principal components of digraph features.

12. The method of claim 9, wherein the machine learning model is a gradient boosted decision tree (GBDT).

13. The method of claim 9 further comprising:
capturing the biometric keystroke measure data during a time in which the examinee takes the long-form examination on a computing device having a keyboard.

14. A system comprising:
at least one data processor; and
memory comprising instructions which, when executed by the at least one data processor, result in operations comprising:

capturing, by keystroke logging software, biometric keystroke measure data generated by an examinee typing on a keyboard when writing one or more essays forming part of a long-form examination, the biometric keystroke measure data characterizing a sequence and duration of typing actions by the examinee during the long-form examination;

extracting features from the biometric keystroke measure data for the examinee, the extracted features characterizing a number, latency, speed, and total time spent for specific typing event, measures of an extent to which words were edited, and measures of fluency of typing;

determining, using (i) a direct distance approach and/or a (ii) machine learning approach, similarity values for the extracted features relative to features extracted from different biometric keystroke measure data derived from each of a plurality of other examinees while taking the long-form examination;

identifying at least one of the determined similarity values having a value above a pre-defined threshold, the pre-defined threshold indicating a likelihood of the examinee being the same as one of the other examinees that generated the different biometric keystroke measure data; and providing data characterizing the identification.

15. The system of claim 14, wherein the providing comprises one or more of: causing the data characterizing the identification to be displayed in an electronic visual display, storing the data characterizing the determination in physical media, loading the data characterizing the determination into memory, or transmitting the data characterizing the identification to a remote computing system.

16. The system claim 14, wherein the extracted features comprise one or more of: writing features, digraph features, combination of writing and diagraph features, principal components of writing features, or principal components of digraph features.

17. The system of claim 16, wherein the direct distance approach uses a cosine similarity to determine the similarity values, and wherein the similarity values are based on distances between determined similarity values for each of a plurality of different feature sets.

18. The system of claim 17, wherein the operations further comprise:
    computing an equal error rate based on the distances.

19. The system of claim 14, wherein the machine learning approaches using at least one machine learning model including a gradient boosted decision tree (GBDT).

20. The system of claim 14, wherein the operations further comprise:
    capturing the biometric keystroke measure data during a time in which the examinee takes the long-form examination on a computing device having a keyboard.

* * * * *